Patented May 14, 1929.

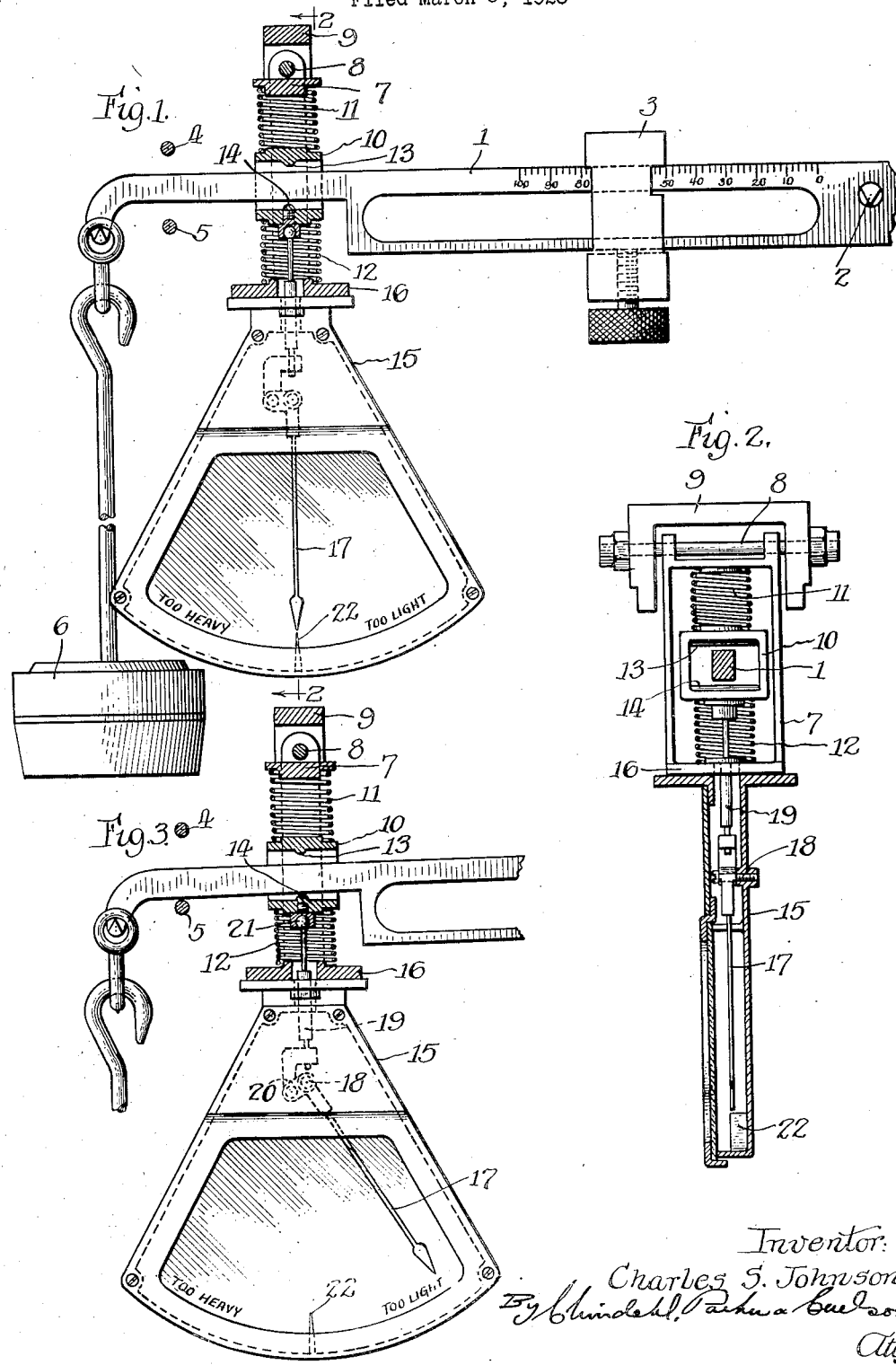

1,712,767

UNITED STATES PATENT OFFICE.

CHARLES S. JOHNSON, OF CHAMPAIGN, ILLINOIS.

INDICATING DEVICE.

Application filed March 3, 1928. Serial No. 258,780.

This invention relates generally to weighing scales and more particularly to an indicating device for a beam scale.

In weighing materials such for example, as sand and gravel used in concrete mixes wherein the weighing apparatus is usually located out in the open, and subjected to varying atmospheric and temperature conditions, it has been found difficult readily to obtain an accurate balance. Generally the material is weighed in a container suspended from the platform or scale member of a weighing device, the material being run into the container from an overhead hopper controlled by a suitable gate. It will be apparent that when the sand or gravel is being discharged into the container, it is desirable to have some method of indicating the approach of a balance somewhat ahead of time so as to give ample opportunity to close the gate sufficiently to reduce the rate of discharge and thus to obtain an accurate control of the final balance.

Efforts have been made to use an indicating pointer or dial type scale but with this type of weighing mechanism inaccuracies occur due to corrosion, temperature changes and the accumulation of foreign material on the movable parts. Because of the accuracy of the beam type of scale and the fact that it is provided with adjusting devices for establishing its accuracy and sensitiveness from time to time, this type of scale is preferred although, as will be apparent, the beam does not indicate in a satisfactory manner the approach of a balance so as to enable the operator to cut down the flow of material and obtain an accurate final balance.

It is the general object of the invention to provide an improved indicating device for beam scales, adapted to indicate when the beam is approaching a balance and, when the beam is nearly balanced, to be entirely free of the beam so as to permit the final balance to be determined by the beam scale.

Another object of the invention is to provide such an indicating attachment of improved construction which may be readily installed on a beam scale.

A further object is to provide an improved indicating device of simple and rugged construction, and efficient in operation.

Further objects and advantages of the invention will be understood from the following detailed description taken in connection with the accompanying drawings in which:

Fig. 1 is a fragmental elevation, partly in section, of the preferred form of the invention mounted in operative relation to a balanced scale beam.

Fig. 2 is a view approximately along the line 2—2 of Fig. 1.

Fig. 3 is a fragmental view similar to Fig. 1 showing the beam in an unbalanced position.

While I have shown in the drawings and will herein describe in detail, the preferred embodiment of my invention, it is to be understood that I do not thereby intend to limit the invention to the specific form disclosed, it being contemplated that various changes may be made by those skilled in the art without departing from the spirit and scope of the invention as expressed in the appended claims.

As illustrated herein, the invention is shown in operative relation to a scale beam 1 which beam has a fulcrum knife edge at 2 and an adjustable weight 3. The free end of the beam is arranged to vibrate between a pair of stops 4 and 5 and may have a weight 6 suspended therefrom.

The indicating device in the exemplary form selected for purposes of disclosure comprises a rectagular frame 7 suspended from a pin 8 which may be mounted from the supporting structure of the scales (not shown) by means of an inverted U-shaped bracket 9. A member 10, herein illustrated in the form of a second rectangular frame is yieldably supported within the frame 7 in a position to surround or straddle a portion of the beam 1 by means of coil springs 11, 12 so that normally the straddling member is positioned substantially mid-way between the ends of the frame 7. The frame 10 is preferably provided with narrow internal ribs 13, 14 along its upper and lower edges for contacting the scale beam, the invention contemplating a certain amount of play of the beam intermediate said ribs so that when the beam is in balanced position it is entirely free of the said frame.

An indicating pointer mechanism is enclosed in a housing 15 secured to the lower edge 16 of the frame 7 by any suitable means, and preferably includes a pointer 17 mounted within the housing on a pivot 18. An adjustable connecting device 19 is pivoted at one end to an arm 20 on the pointer and at the other end has a ball and socket connection 21 with the member 10.

It will be apparent that the pointer 17 is limited in its movement by the amount of play of the beam 1 intermediate the stops 4 and 5. Thus with the weights 3 and 6 properly adjusted to balance at the desired weight and the scale pan or container (not shown) empty, the pointer will be to one side of the zero or neutral point and will indicate "too light". As material is discharged into the scale pan and approaches a balance, the beam 1 is finally raised from the stop 5. As soon as the beam leaves the stop, the pointer 17 will move towards the zero point 22, thus indicating to the operator that a balance is being reached. The operator is thereby warned to add additional material slowly and when the pointer has reached the zero point 22, the final balance may be obtained directly by means of the beam 1 because of the play of the beam intermediate the ribs 13, 14.

The invention is readily adapted for use with scale beams and provides a definite and effective indication of the approach of a balanced condition. By providing a certain amount of play of the beam between the contact ribs on the straddling member 10, the final accurate weighing may be accomplished by means of a beam scale alone. In this way the accuracy of the beam scale is not altered by reason of any contact with the indicating device.

I claim as my invention:

1. In combination with a scale beam, an indicating device comprising a rectangular frame positioned adjacent to and surrounding the free end of the beam, a member positioned within said frame straddling said beam and arranged for a slight vertical movement relatively thereto, a pair of coil springs between said member and frame arranged normally to position said member free of the beam when balanced, a housing secured to said frame containing a pivotally mounted pointer, and means connecting said member and said pointer.

2. An indicating device for scale beams comprising in combination, a rectangular frame adapted to be positioned adjacent to the free end of the beam, a collar positioned within said frame adapted to surround the beam and having an opening of a size arranged for a slight vertical movement relatively thereto, a pair of coil springs between said collar and frame, a housing secured to said frame and containing a pivotally mounted pointer, and means connecting said collar with said pointer.

3. An indicating device for scale beams comprising a support adapted to be positioned adjacent the beam, a member yieldably mounted upon said support arranged to straddle a portion of the beam, resilient means arranged normally to support said member on a level with the balanced position of the beam, a housing secured to said support containing a movably mounted pointer, and means connecting said member and pointer.

4. An indicating device for scale beams comprising a frame arranged to be positioned adjacent to the free end of a beam, a member yieldably supported in said frame having portions arranged to straddle the beam, a pair of coil springs positioned intermediate said member and portions of the frame adapted normally to position the member on a level with the balanced position of the beam, an indicating device movably mounted on said frame, and a connection between said member and indicating device including a rod extending longitudinally through one of said springs.

In testimony whereof, I have hereunto affixed my signature.

CHARLES S. JOHNSON.